2,447,911

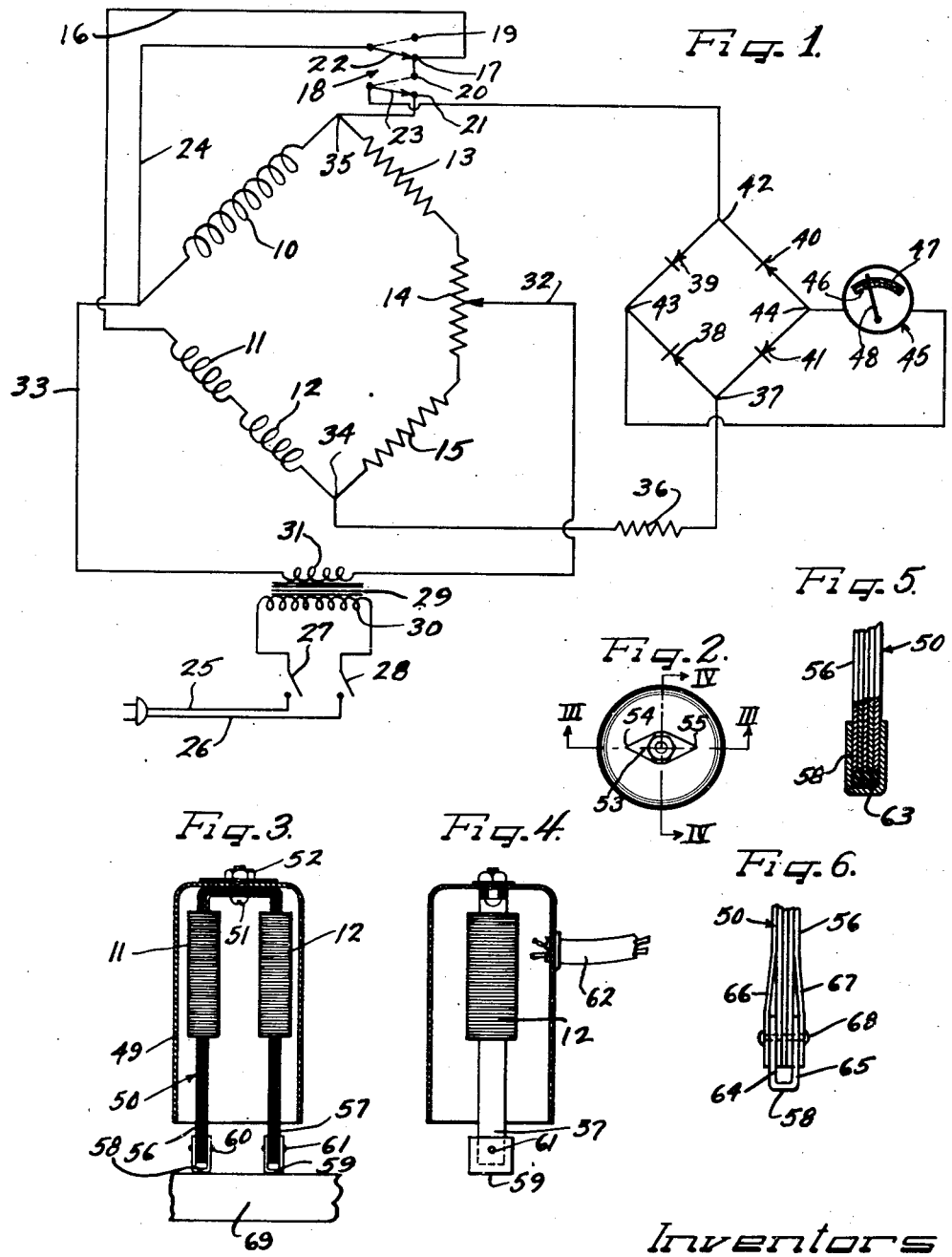
Aug. 24, 1948.   M. L. MAGES ET AL   2,447,911
MAGNETIC FIELD GAUGE
Filed July 20, 1945
Inventors
MORRIS L. MAGES
GRANT W. COON Patented Aug. 24, 1948

UNITED STATES PATENT OFFICE 2,447,911

MAGNETIC FIELD GAUGE

Morris L. Mages and Grant W. Coon, Chicago, Ill., assignors to Magnaflux Corporation, Chicago, Ill., a corporation of Delaware Application July 20, 1945, Serial No. 606,200

1 Claim. (Cl. 175—183)

This invention relates to a magnetic field gauge and more particularly to a field gauge circuit and structure which will give an indication of the intensity of magnetization of ferromagnetic parts which are being subjected to either direct, pulsating unidirectional or alternating magnetizing current.

In testing irregularly shaped ferromagnetic parts by magnetizing the part and dusting it with finely divided paramagnetic particles, it is often desirable to determine whether all portions of the part are being magnetized strongly enough to show up cracks or other discontinuities. In magnetic particle inspection apparatus, cracks and other discontinuities are shown up by magnetizing an object and then dusting the same with paramagnetic particles, it being remembered that cracks and other discontinuities will cause a clustering or heavy grouping of the paramagnetic particles at the cracks or discontinuities.

One of the principal features and objects of the present invention is to provide a device which in one manner of use is essentially an inductance bridge but which has a novel circuit arrangement so that the device may be quickly and conveniently used when the ferromagnetic part is being magnetized by either an alternating or unidirectional current.

A further object of the present invention is to provide a novel magnetic field gauge which is economical to manufacture, which is rugged and reliable in use, and which is extremely reliable in indicating the intensity of magnetization of various portions of an irregular shaped ferromagnetic part.

Another object of the present invention is to provide a novel field gauge head unit which conveniently and quickly adjusts itself to irregularities in different directions.

A still further object of the present invention is to provide a novel field gauge head including a pair of core legs having adjustable boots thereon for automatically adjusting themselves to irregularities of the surface of the ferromagnetic part being tested.

Still another object of the present invention is to provide a novel field gauge head in which the windings are so exposed that currents induced in them due to stray fields cancel and do not show up as a meter reading.

Another and still further object of the present invention is to provide a novel method and means for measuring the intensity of a magnetic field in a magnetized ferromagnetic part.

The novel features which are believed to be characteristic of my invention are set forth with particularity in the appended claim. My invention itself, however, both as to its organization, manner of construction and method of operation, together with further objects and advantages thereof, may best be understood with reference to the following description, taken in connection with the accompanying drawing, in which:

Figure 1 is a diagrammatic view of a magnetic field gauge embodying the novel teachings of the present invention;

Figure 2 is a plan view of the field gauge head which contains the pick-up coils of one arm of the inductance bridge shown in Figure 1;

Figure 3 is a vertical sectional view taken along the line III—III of Figure 2;

Figure 4 is a vertical sectional view taken along the line IV—IV of Figure 2;

Figure 5 is a fragmentary sectional view illustrating a modification of the leg and boot structure of the field gauge head; and Figure 6 is another modification of the leg and boot structure of the field gauge head.

In the embodiment of my invention shown in Figure 1 of the drawing, the magnetic field gauge includes an inductance bridge having a standard inductance coil 10 in one arm of the bridge and two inductance coils 11 and 12 in a second arm of the bridge. The two inductance coils 11 and 12 have the same total inductive reactance as the single inductance coil 10. The right hand end of the inductance coil 10 is connected to a resistance element 13 which in turn is connected to one end of a potentiometer 14. The other end of the potentiometer 14 is connected to another resistance element 15 which in turn is connected to one end of the two inductance coils 11 and 12. It will be observed that the two inductance coils 11 and 12 are connected in series.

The left-hand end of the inductance coil 11 is connected through a conductor 16 to the stationary contact 17 of a switch generally designated by the reference character 18. This switch 18 is of the double pole double throw type having three other stationary contacts 19, 20 and 21 in addition to the stationary contact 17. Switch 18 is also provided with two movable contact arms 22 and 23. The movable contact arm 22 is arranged to be in engagement with either the stationary contact 17 or the stationary contact 19, while the movable contact arm 23 is arranged to be in engagement with either the stationary contact 21 or the stationary contact 20. The two stationary contacts 17 and 20 are connected together so that the movable contact 22 or the movable contact 23 is arranged to be connected to the conductor 16 depending upon whether the movable contacts 22 and 23 are in their full line positions or in their dotted line positions, as shown in Figure 1.

The left-hand end of the inductance coil 10 is connected through a conductor 24 to the movable contact 22. It will thus be seen that when the movable contacts 22 and 23 are in their full line positions as shown in Figure 1 the inductance bridge circuit is closed by connecting the left-hand end of the coil 11 to the left-hand end of the coil 10.

Alternating current power is supplied through the power conductors 25 and 26, switches 27 and 28 and a transformer 29 to opposite corners of the bridge circuit. More particularly, the transformer 29 is provided with a primary winding 30 and a secondary winding 31, the latter of which is connected to the movable contact element 32 of the potentiometer 14 and to the left-hand end of the coil 10 through the conductor 33. The two remaining corners of the inductance bridge, namely, the corners 34 and 35, are connected in the manner shown in Figure 1. More particularly, the corner 34 is connected to a resistance element 36 which in turn is connected to the corner 37 of a square-form rectifier circuit including the rectifiers 38, 39, 40 and 41. The direction of flow of current through the rectifiers is clearly shown by the arrows. The corner 35 of the inductance bridge is connected to the stationary contact 21 of the switch 18 and thence through the movable contact 23 to the corner 42 of the square-form rectifier circuit. The two remaining corners 43 and 44 of the square-form rectifier are connected to a suitable indicating instrument 45, such as a milliammeter, having a full scale reading, for example, of one milliampere. These rectifiers 38, 39, 40 and 41 are thus so arranged that current flows towards the corner 43 through the instrument 45 and away from the corner 44.

As shown on the drawings, the scale 46 of the instrument 45 may be the conventional scale of a milliammeter, while the scale 47 may be calibrated in suitable units to indicate the degree of magnetiization of the part being tested in the vicinity of the field gauge head which includes the coils 11 and 12. Let it be assumed that the zero of the milliammeter scale is at the left and that maximum position reading is at the right as viewed in Figure 1 of the drawings. Under certain circumstances the units on the scale 47 will be maximum at the left-hand end and a minimum at the right-hand end. The reason for this will presently appear, when the operation of the device is described.

Referring now to Figures 2, 3 and 4 of the drawings, there is shown therein one embodiment of a field gauge head for use in a circuit of the type illustrated in Figure 1. More particularly, the field gauge head includes a housing 49 in which a laminated U-shaped yoke 50 is secured at its upper end by means of a bolt 51 and a nut 52. Also secured by the bolt 51 and nut 52 is a diamond-shaped element 53 which may be conveniently formed of brass or the like which is lined up with its points 54 and 55 in such a manner as to indicate at a glance the line-up of the legs 56 and 57 of the yoke 50. The yoke 50 may be made of any suitable ferromagnetic material having a relatively high magnetic permeability and a relatively low magnetic retentivity. Mounted on the two legs 56 and 57 of the yoke 50 are the two coils 11 and 12 already referred to in connection with the description of Figure 1 of the drawings. The yoke 50 thus provides a ferromagnetic core for the coils 11 and 12. The casing 49 is preferably made of iron or other suitable ferromagnetic material so as to shield the coils 11 and 12 from stray magnetic fields. By arranging the coils 11 and 12 in the manner shown in Figures 3 and 4, it has been found that currents induced in them due to stray fields cancel, and hence do not show up in the meter 45.

One of the important features of the present invention is the boot construction which is provided for the legs 56 and 57 of the yoke 50. In the form of the invention shown in Figures 3 and 4 of the drawings, the boots 58 and 59 are pivotally mounted by pins 60 and 61 on the legs 56 and 57, respectively. The boots 58 and 59 are in the form of U-shaped strips of ferromagnetic material and it will be noted that the bight of the U is spaced from the lower ends of the associated legs of the yoke 50. This enables limited angular movement of the boots with respect to the legs. It has been found that this arrangement is particularly effective since the field gauge head may be moved against an irregularly shaped body 68 being tested and the two boots 58 and 59 will automatically adjust themselves so as to make good magnetic contact with the surface of the irregularly shaped body. The overlapping relationship of the legs of the boots 58 and 59 with respect to the legs 56 and 57 is sufficient to provide a low reluctance path from the boots to the yoke 50. The coils 11 and 12 are electrically connected back to the remaining part of the inductance bridge circuit through the cable 62. In order to keep foreign particles out of the housing, the housing is preferably filled with a hard plastic insulating material (not shown).

The operation of the magnetic field gauge described in connection with Figures 1 to 4 of the drawings will now be considered. In the original design of the instrument, the coil 10 is chosen so that its inductance is as close as possible to the combined inductance of the coils 11 and 12. Similarly, the resistance elements 13 and 15 are also alike. It will thus be seen that when the switches 27 and 28 are closed and the supply conductors 25 and 26 are connected to a source of alternating current electric energy, the milliammeter 45 will have its pointer 48 approximately at the zero point of the scale 46. It is in this position when the pick-up head containing the coils 11 and 12 is away from any ferro-magnetic part. The pick-up or field gauge head is then moved into position against the part 69 to be tested with the boots 58 and 59 firmly seated on the surface of the part 69. No field, however, is being passed through the part 69 to be tested. Since the boots 58 and 59 are against a ferromagnetic part, it will be seen that a closed ferromagnetic path is now provided for the pickup head which includes the yoke 50 and a portion of the part to be tested. This very greatly increases the inductive reactance of the coils 11 and 12 and thus unbalances the bridge circuit. The unbalance of bridge circuit causes current to flow in the milliammeter 45. The movable contact 32 on the potentiometer 14 is now adjusted so that this unbalance causes a full scale deflection of the pointer 48 of the milliammeter 45. That is to say, the contact 32 is adjusted until the pointer 48 moves to its full scale position and thus reads one milliampere. During this operation as above described, the movable contacts 22 and 23 of the switch 18 are of course in their full line positions as shown in Figure 1.

A magnetic field is now established in the part to be tested. This may be done by passing a direct current through the part, and in such event this creates a magnetic field in the part to be tested at right angles to the direction of current flow. The field may, however, be produced in any other manner without departing from the spirit and scope of the present invention. A magnetic field in the region of the pick-up head and the part to be tested will cause the milliammeter reading to drop. Furthermore, as the magnetic field increases in the test piece, the incremental permeability decreases. It will therefore be apparent that as the magnetic field increases the inductive reactance of the coils 11 and 12 of the pick-up head also decreases. This lowering of the inductive reactance of the coils 11 and 12 causes less of an unbalance in the bridge circuit and thus the pointer 48 on the milliammeter 45 moves towards its zero position. We thus see that the reluctance of the iron path which comprises a complete core for the coils 11 and 12 varies with the intensity of the magnetic field in the regoin between the boots 58 and 59. The reason for this, of course, is that for any constant value of superimposed alternating flux density (as produced by the alternating current flowing through the coils 11 and 12) the incremental permeability decreases as the polarizing magnetic intensity increases. It will furthermore be apparent from the above that the scale 47 of the milliammeter 45 may be suitably calibrated from right to left to indicate the flux density in the forromagnetic part being tested in the region between the boots 58 and 59.

In practice, of course, the pickup heads will be moved back and forth over the surface of the part to be tested so as to determine whether all of such part is sufficiently magnetized to provide a suitable indication with paramagnetic particles if there are any cracks or discontinuities in the part. The orientation of the legs 56 and 57 should, of course, be kept at right angles to the direction of the flow of current through the part to be tested since this is the direction of the magnetic field set up in the part. Where there is uncertainty as to the direction of the current flow and hence uncertainty as to the direction of the magnetic field in the part to be tested, the pickup head may be slowly turned until a maximum flux density indication is given by the meter 45. The particular orientation of the legs 56 and 57 at a maximum reading in any one spot will hence give the axis of magnetic field at that point. The double pointer 53 on the top of the housing 49 serves to give a convenient indication of the orientation of the legs 56 and 57 so as to indicate the axis of the magnetic field at a glance when the meter 45 has given a maximum flux density indication.

The magnetic field gauge which has been described above also may be used when the part to be tested is subjected to the magnetizing effect of a fluctuating magnetic field such as produced by an alternating excitation current or a pulsating direct current. Under such circumstances, the switch 18 is thrown so that the movable contacts 22 and 23 are in engagement with the stationary contacts 19 and 20. This disconnects the coils 11 and 12 from the bridge circuit as well as from the power supply fed through the conductors 25 and 26. More particularly, it connects the coils 11 and 12 of the pick-up head directly across the square-form rectifier circuit. When the pick-up head is now moved into position against the part to be tested, an alternating current is induced in the coils 11 and 12 due to the reversing or pulsating magnetic field in the part being tested. The voltage induced in the coils 11 and 12 will thus be a function of magnetization and hence the degree of magnetization would be indicated directly by the milliammeter reading on the scale 46. Note that in this instance the scale 46 is used rather than the scale 47 to determine the extent of effect of the magnetizing current on the part being tested.

A modified form of boot structure for the pick-up head is shown in Figure 5 of the drawings. More particularly, the boot 58 is merely pinched onto the lower end of the leg 56 of the yoke 50 rather than by securing it with a pin 60 as described in connection with Figure 3. In this instance, a resilient rubber pad 63 is provided between the bottom of the boot 58 and the lower end of the leg 56. The boot has a certain amount of flexibility and may automatically adjust itself to irregularities in the surface of the part against which it is placed. A similar boot is, of course, provided for the other leg of the yoke 50.

A third form of boot construction is shown in Figure 6 of the drawings. In this construction, the boot 58 has its legs 64 and 65 inserted between the outer laminations 66 and 67 of the laminated leg 56 of the yoke 50. A pin 68 holds the boot 58 in place and allows limited angular movement of the latter. Note that the bottom of the boot 58 is spaced from the lower end of the leg 56. The advantage of this form of construction is that a better magnetic contact is made between the boot 58 and the leg 56 and thus provides a lower reluctance path at this point.

While we have shown a particular embodiment of our invention, it will, of course, be understood that we do not wish to be limited thereto, since many modifications may be made, and we, therefore, contemplate by the appended claim to cover all such modifications as fall within the true spirit and scope of our invention.

We claim as our invention:

A magnetic field gauge pick-up head comprising a laminated U-shaped paramagnetic core, at least one inductance coil mounted on said core, and paramagnetic boots mounted on the lower ends of the legs of said core, said boots having portions thereof extending between laminations whereby better magnetic contact is maintained between said boots and said legs.

MORRIS L. MAGES.
GRANT W. COON.

REFERENCES CITED

The following references are of record in the file of this patent:

UNITED STATES PATENTS

| Number | Name | Date |
| --- | --- | --- |
| 1,360,326 | Slepian | Nov. 30, 1920 |
| 1,494,733 | Carpenter et al. | May 20, 1924 |
| 1,966,984 | Lichtenberger | July 17, 1934 |
| 2,020,067 | Keinath | Nov. 5, 1935 |
| 2,065,379 | Kerr et al. | Dec. 22, 1936 |
| 2,388,848 | Howe | Nov. 13, 1945 |

FOREIGN PATENTS

| Number | Country | Date |
| --- | --- | --- |
| 437,648 | Germany | Nov. 25, 1926 |
| 497,095 | Great Britain | Dec. 13, 1938 |

OTHER REFERENCES

Electronics, November 1943, pages 158, 160, 162, and 164.